June 24, 1930.    D. F. BURKE    1,766,596
COLLAR SUPPORT
Filed Feb. 25, 1929

Inventor:
David F. Burke.
by Charles V. Gooding,
Atty.

Patented June 24, 1930

1,766,596

UNITED STATES PATENT OFFICE

DAVID F. BURKE, OF MANCHESTER-BY-THE-SEA, MASSACHUSETTS

COLLAR SUPPORT

Application filed February 25, 1929. Serial No. 342,383.

This invention relates to a collar support.

The object of the invention is to provide a simple and cheap support for the ends of a soft collar and one which can be easily attached to or detached from the collar.

The invention consists in a support for the end of a collar as hereinafter specifically described in the specification and particularly pointed out in the claims.

Referring to the drawings.

Like numerals refer to like parts in the several views of the drawings.

Figure 1:
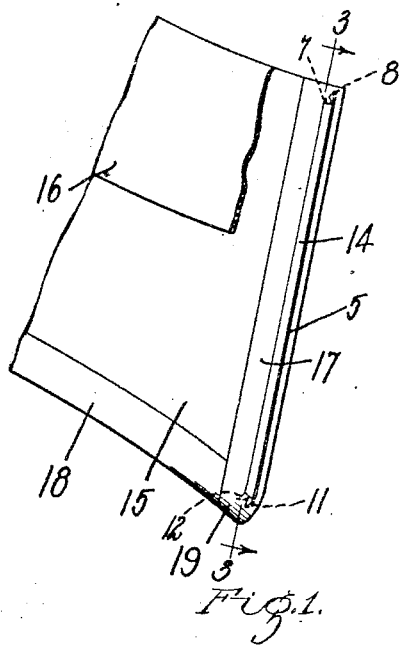
Figure 1 is a perspective view of the front end of a soft collar broken away, and viewed from the rear.
Figures 2, 3:
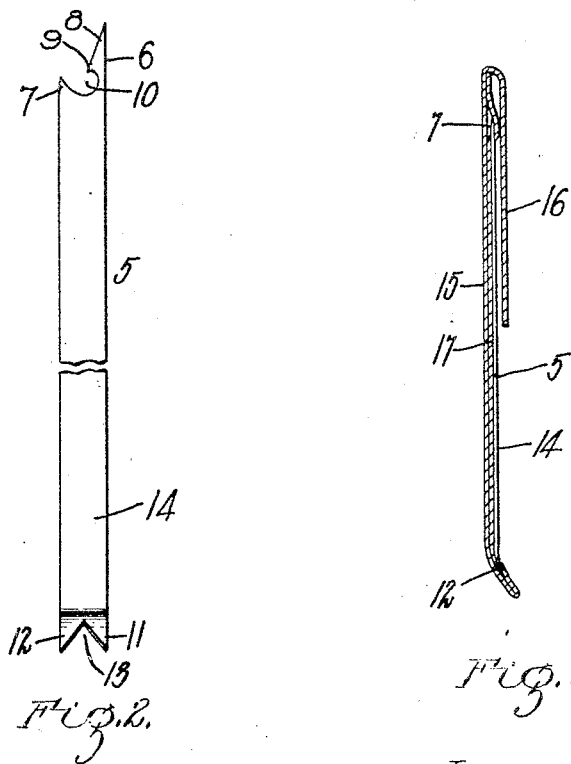
Fig. 2 is a front elevation of the collar support of my invention, the same being shown on an enlarged scale and broken away.
Fig. 3 is a longitudinal section taken on line 3—3 of Fig. 1 illustrating the manner in which the collar support is attached to the collar.

In the drawings, 5 is the collar support consisting of a single strip of stiff material, preferably steel, and terminating at its upper end in a pair of prongs 6 and 7, the prong 6 having a wedge-shaped point 8, and a hook-shaped projection 9 on its inner edge, the prong 6 being much longer than the prong 7. The prongs 6 and 7 are spaced apart by a recess 10.

The lower end of the collar support terminates in a pair of prongs 11 and 12 spaced apart by a V-shaped recess 13. The prongs 11 and 12 are inclined inwardly from the inner face 14 of the support. The collar support is shown attached to the outer part 15 of a collar, the inner part 16 being shown broken away in order that the invention may be more clearly illustrated. The part 15 is provided with a hem 17 along its front edge and a hem 18 along its lower edge.

In attaching the support to the collar, the sharp prongs 11 and 12 at the lower end of the support are inserted in the hem 17. The support is then rotated upwardly into contact with the hem 17 and is slightly bent while the prongs 6 and 7 are inserted in the hem 17. It is then released and the device is in readiness for use.

The prongs 11 and 12 being spaced apart by the V-shaped recess 13, after they have been inserted in the hem 17, prevent the holder from moving downwardly beyond a certain point to which they are inserted. The prongs 6 and 7 being spaced apart by the concave recess 10, will prevent the support from moving upwardly relatively to the hem 17 as the portion of the collar in which it is inserted will bottom in the recess 10 so that the support is thus prevented from moving upwardly. It is also prevented from moving downwardly by the bottom of the recess 13. The prongs 6 and 7 and 11 and 12 also prevent the support from a sidewise movement relatively to the collar, and the projection 9 on the inner edge of the prong 6 acts as a hook to further hold the material in which the hook is inserted from becoming disconnected from the support.

The inward inclination of the prongs 11 and 12 cause the lower front corner 19 of the part 15 to be bent inwardly and thus prevent the portion 15 of the collar when in use from curling outwardly and wrinkling adjacent the lower edge thereof.

It will be understood that while the collar support 5 of my invention holds the front edge of the collar stiff, the lower edge of the collar will be left flexible and thus prevent the shirt from becoming worn by said lower edge.

I claim:

1. A collar support comprising a strip of stiff material, one end terminating in a pair of prongs, one of said prongs extending longitudinally of said strip beyond the other and having a hook-shaped projection on its inner edge.

2. A collar support comprising a strip of stiff material, one end terminating in a pair of prongs, the other end terminating in a pair of prongs, one of which extends beyond the other longitudinally of said strip and having a hook-shaped projection on its inner edge.

3. A collar support comprising a strip of stiff material, one end terminating in a pair of prongs, the other end terminating in a pair of prongs, one of which extends beyond the other and has a projection on its inner edge.

In testimony whereof I have hereunto set my hand.

DAVID F. BURKE.